United States Patent
Arunachalam (10) Patent No.: US 12,299,482 B2
(45) Date of Patent: May 13, 2025

(54) CASCADED PRIORITY MAPPING

(71) Applicant: Hewlett Packard Enterprise Development LP, Houston, TX (US)

(72) Inventor: Somasundaram Arunachalam, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 543 days.

(21) Appl. No.: 17/519,058

(22) Filed: Nov. 4, 2021

(65) Prior Publication Data

US 2023/0076061 A1    Mar. 9, 2023

(30) Foreign Application Priority Data

Sep. 7, 2021   (IN) .............................. 202141040633

(51) Int. Cl.
*G06F 9/48* (2006.01)
(52) U.S. Cl.
CPC .......... *G06F 9/4881* (2013.01); *G06F 9/4831* (2013.01)
(58) Field of Classification Search
None
See application file for complete search history.

(56) References Cited

U.S. PATENT DOCUMENTS

| 6,148,324 | A | * | 11/2000 | Ransom | ................ | G06F 9/5083 |
|---|---|---|---|---|---|---|
| | | | | | | 718/103 |
| 8,209,703 | B2 | * | 6/2012 | Yee | ...................... | G06F 16/254 |
| | | | | | | 710/21 |
| 8,977,752 | B2 | | 3/2015 | Arimilli | | |
| 9,158,540 | B1 | | 10/2015 | Tzelnic et al. | | |
| 9,244,652 | B1 | * | 1/2016 | Ellis | ...................... | G06F 9/5066 |
| 9,286,261 | B1 | | 3/2016 | Tzelnic et al. | | |
| 9,846,623 | B2 | | 2/2017 | Jennings et al. | | |
| 9,652,568 | B1 | | 5/2017 | Tzelnic et al. | | |
| 10,282,821 | B1 | | 5/2019 | Warren et al. | | |
| 10,387,198 | B2 | | 8/2019 | Poort et al. | | |
| 2004/0054998 | A1 | * | 3/2004 | Hayashi | ................ | G06F 9/4887 |
| | | | | | | 718/102 |
| 2005/0229151 | A1 | * | 10/2005 | Gupta | .................... | G06Q 10/06 |
| | | | | | | 717/101 |
| 2006/0112388 | A1 | * | 5/2006 | Taniguchi | ............. | G06F 9/5083 |
| | | | | | | 718/100 |
| 2007/0277149 | A1 | * | 11/2007 | Stevens | ..................... | G06F 8/33 |
| | | | | | | 717/109 |

(Continued)

FOREIGN PATENT DOCUMENTS

| WO | WO-2019241171 | 12/2019 |
|---|---|---|
| WO | WO-2020221799 | 11/2020 |

OTHER PUBLICATIONS

HPE, "CHPS MDC FAM", 2024, 16 Pages.

(Continued)

*Primary Examiner* — Adam Lee
(74) *Attorney, Agent, or Firm* — Dickinson Wright (57) ABSTRACT

Approaches for scheduling a set of tasks at compute nodes within a cluster computing environment based on a priority, are described, In an example, a cascaded priority mapping comprising cascaded priority value nodes, wherein the priority value nodes correspond to the set of tasks that are to be scheduled. Each of the priority value nodes specify a priority value attributed to respective tasks from amongst the set of tasks.

20 Claims, 7 Drawing Sheets

(56) References Cited

U.S. PATENT DOCUMENTS

| | | | | |
|---|---|---|---|---|
| 2009/0271796 | A1* | 10/2009 | Kojima | G06F 9/4881 |
| | | | | 718/107 |
| 2011/0087731 | A1* | 4/2011 | Wong | G06F 9/505 |
| | | | | 709/204 |
| 2014/0325374 | A1* | 10/2014 | Dabrowski | G06F 3/048 |
| | | | | 715/744 |
| 2014/0380322 | A1* | 12/2014 | Ailamaki | G06F 9/5066 |
| | | | | 718/102 |
| 2015/0205644 | A1* | 7/2015 | Ito | G06F 9/4881 |
| | | | | 718/103 |
| 2018/0067894 | A1 | 3/2018 | Doi | |
| 2018/0181608 | A1* | 6/2018 | Wu | G06F 16/2423 |
| 2019/0019269 | A1* | 1/2019 | Itagaki | G06T 1/20 |
| 2019/0138007 | A1* | 5/2019 | Baghsorkhi | G08G 1/16 |
| 2019/0146998 | A1* | 5/2019 | Jin | G06F 9/4881 |
| | | | | 718/104 |
| 2019/0227777 | A1* | 7/2019 | ChoFleming, Jr. | G06F 8/34 |
| 2020/0027354 | A1* | 1/2020 | Goldman | G06Q 10/063118 |
| 2021/0014303 | A1* | 1/2021 | Guim Bernat | H04L 41/5051 |

OTHER PUBLICATIONS

HPE, "HP-CM", 2024, 1 page.
HPE, "HPE Performance Cluster Manager", QuickSpecs, Oct. 11, 2021, 13 pages.

\* cited by examiner

CASCADED PRIORITY MAPPING

BACKGROUND

High Performance Computing (HPC) machines are implemented by interconnecting a plurality of compute nodes to form a duster computing network, Such compute nodes may be implemented as either a processor or may be a processor-based system. HPC machines or systems or complex systems which may be used for modelling, simulating, or analyzing complex physical or algorithmic problems; which are known to be computationally very extensive. Even for computationally extensive and complex systems that implement a large number and a wide variety of interdependent processes and controls, performance of such HPC machines is assessed based on parallel scalability of the compute nodes. Therefore, a multitude of processes which may occur in parallel and forming a part of a complex system may be realized using the HPC machines.

BRIEF DESCRIPTION OF FIGURES

Systems and/or methods, in accordance with examples of the present subject matter are now described and with reference to the accompanying figures, in which.

DETAILED DESCRIPTION

High Performance Computing (HPC) machines are implemented by interconnecting multiple compute nodes to form a duster computing network. The compute nodes may be implemented as a processor from amongst a plurality of processors within a computing system, or as a logical combination of a group of processors within a computing system forming a compute node. In such a case, a computing system may implement a plurality of nodes. In another case, a compute node may be implemented as a singular processor-based system. HPC machines or systems may be used for modelling, simulating, or analyzing complex physical or algorithmic problems, which are known to be computationally extensive. Even for complex systems having a wide variety of interdependent processes and controls, performance of such HPC machines is assessed based on parallel scalability of the compute nodes. Therefore, a multitude of processes which may occur in parallel and forming a part of a complex system may be realized using the HPC machines.

In certain instances, a set of processes may be such that they are to take precedence over other processes. In such cases, processes may be associated with priority values which processes will take precedence during execution at any one or more compute nodes. Depending on the priorities which may be associated, the processes may be scheduled for execution at the compute nodes. To this end, a node designated as a scheduler node. The scheduler node may accordingly schedule the execution of the processes based on their allocated priority values. In such a way, different tasks may be implemented In comparison, scheduling of processes for complex systems poses a number of challenges. Such challenges arise due to the overall complexity of such systems, examples of which include, but is not limited to, systems implementing processes involved in biological gene modelling, sampling of radio astronomical data, sampling of space environments received from a satellite, and autonomous vehicle. Such complex systems may implement variety of functions which in turn may include an exponentially large number of processes or tasks, which may be computationally extensive to execute and implement. Some of these tasks may further include nested sub-tasks. In cases where a multitude of tasks are to be implemented, scheduling of such processes may be challenging. For example, allocating priorities for such a large number of tasks (including the sub-tasks) itself may involve determining which tasks and sub-tasks would take precedence and accordingly allocate the priorities. Such large numbers of tasks along with their sub-tasks, may either be executed in parallel with other processes or may be executed only after certain other tasks (or in some cases, sub-tasks) have completed execution. Accounting for, and eventually realizing functional flows of such tasks and their nested sub-tasks may be challenging considering that complex system may invoke multiple tasks (and the sub-tasks) for carrying out certain functions. Determining the appropriate priority values that are to be assigned to tasks and the sub-tasks, while taking into consideration tasks that may either take precedence over other tasks or that may be executed in parallel, may pose challenges.

Approaches for scheduling tasks by a compute node within a cluster computing network, are described. The scheduling of the set of tasks is based on a cascaded priority mapping which in turn includes multiple interconnected nodes referred to as priority value nodes. Each of the priority value nodes within the cascaded priority mapping may be arranged recursively in the form of a hierarchical tree structure, with each priority value node defining priorities for a task to which the node is associated with. The priorities for the tasks may be specified through values attributed to the priority value nodes. Each of the priority value nodes may be associated with a priority value. At the time of scheduling, the set of tasks or sub-tasks may be scheduled based on the priority value associated with the priority value node.

In an example, the priority value nodes within the cascaded priority mapping may be arranged in layers or cascades of priority value nodes, with each layer defining priorities, for a set of tasks, through serially connected priority value nodes. Successive layers may include further priority value nodes which may be linked to sub-tasks of tasks of the preceding layer. The cascaded priority mapping may further include multiple such layers forming succession of further sub-tasks, with such further sub-tasks linked to their respective parent tasks in the preceding layer. As a result, such multiple layers of priority values nodes successively linked to tasks and further priority value nodes linked to sub-tasks form a hierarchical cascaded arrangement. The successive linking of the priority values of the tasks and its constituent sub-tasks may be referred to a priority chain. The multiple layers of the priority value nodes along with the priority chains may be considered as collectively forming the cascaded priority mapping.

The set of tasks may be sequenced such that they form a functional flow, with a particular task being linked or associated with a preceding task or a following task. In a similar manner, the priority values may be represented as a series of interconnected nodes forming the priority cascade mapping, which in turn, may follow the flow of the set of tasks. Each of the values in the priority cascade mapping, may correspond to and may be associated with one of the tasks which are to be performed. The priority values may be determined based on the tasks and its role in implementing the software-enabled system.

A set of tasks to be implemented by a software-enabled system may further include either a single sub-task or multiple sub-tasks. Such sub-tasks may be implemented when the task (referred to as a parent task) within which the sub-tasks are nested, is invoked. As may be understood, when such a parent task is invoked, the sub-tasks may be thereafter be scheduled based on their respective priority values as per a cascaded-hereditary-priority-chain values. In an example, the priority values of the sub-tasks may be realized through a priority chain branching off from, or originating from, the priority value node corresponding to the parent task. The priority chain may in turn may be considered as providing a series of priority chain values for the sub-tasks, with such priority values originating from the priority value node corresponding to parent task.

In this manner, priority values for a large number of tasks grouped into sets of tasks may be provided by way of the cascaded priority mapping. The association of hereditary priority values with the tasks and the sub-tasks may be performed at the time of designing or modelling of software-enabled systems. Such software-enabled systems may be highly complex involving a large number of computationally extensive tasks that may be scheduled and executed at the compute nodes within the cluster computing network.

The cascaded priority mapping may be associated with a specific set of tasks corresponding to a certain function to be performed by the complex software-enabled systems. One such example in the context of an autonomous vehicle may include, but is not limited to, detection of obstruction or objects in its path and taking appropriate action. Other examples may include other control functions that may be performed by such an autonomous vehicle, but which may be associated with a cascade priority which may be lower than a cascade priority associated with the obstruction detection function. In such a case, the scheduling node may schedule the set of tasks corresponding to the obstruction detection function such that it has precedence over other sets of tasks that may be performed. For scheduling, the scheduling node may obtain the priority values from the cascaded priority value mapping for the various tasks (and corresponding sub-tasks) that be performed.

In an example, each priority value node within the priority chain may also be an originating node for a further nested cascade of priority values which may be linked to other tasks that may be performed. The nested cascade of priority values may have subsequent priority chains (and further subsequent cascades in a nested manner). As may be noted, priority for complex functions of the software-enabled systems which may have a plurality of tasks, may be implemented as a plurality of cascades of priority value sets, with priorities of further nested sub-tasks being implemented as priority chains. Such an approach allows providing priority values for complex processes which may involve executing massive number of tasks in parallel. Accordingly, priority cascades and priority chains may be defined for parallel processing or execution of multiple tasks. These and other approaches are further explained in conjunction with the accompanying figures.

The cascaded priority mapping may be implemented through a variety of data structures. An example of such a data structure includes, but is not limited to, a lookup table. The lookup table may include name of a cascade for a given level mapped to a unique identifier. In an example, the unique identifier may include a common base identifier corresponding to a parent cascade, and a listing identifier. The listing identifier may, in an example, denote a level of the cascade of the priority value nodes. In another example, the cascaded priority mapping may be implemented as a hierarchical tree, an example of which includes a Van Emde Boas tree (vEB tree). It may be noted that the manner in which the priority cascade mapping are implemented are only indicative. Other example implementations of priority cascade mappings are also possible without deviating from the scope of the present subject matter.

Figure 1:
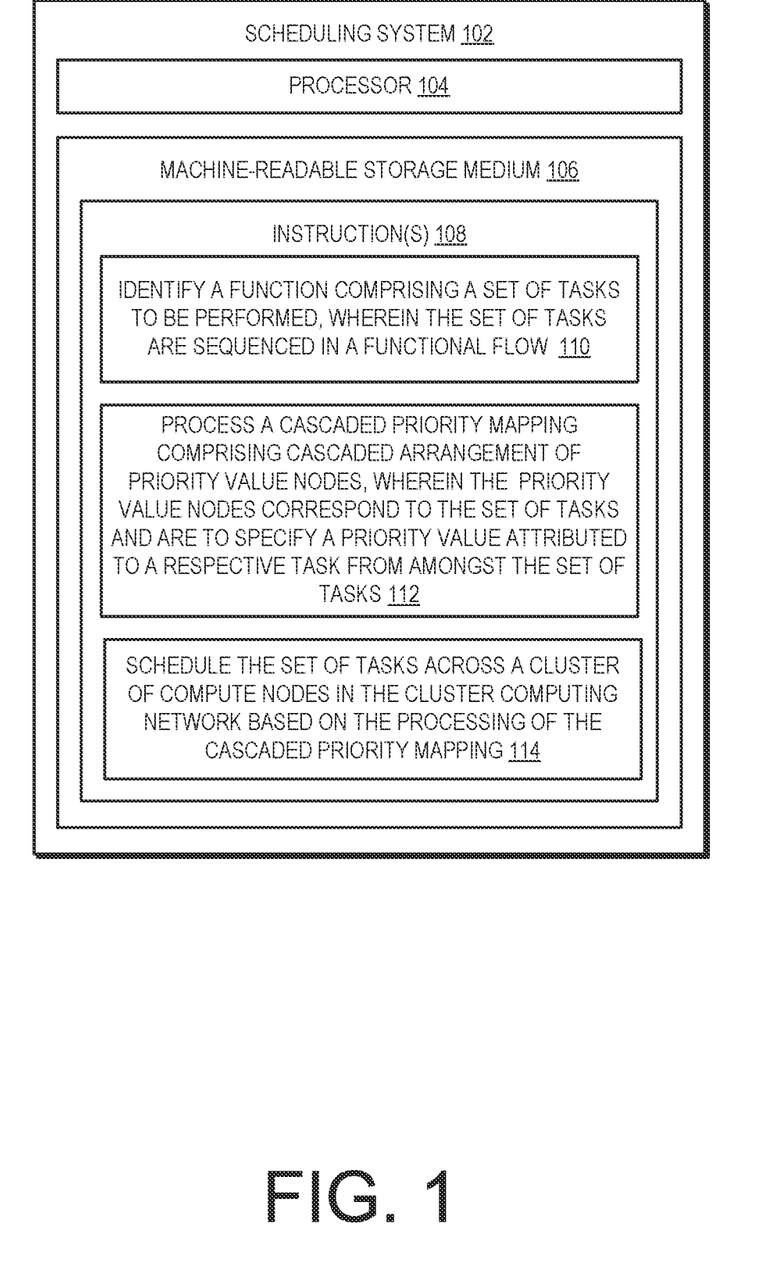
FIG. 1 illustrates a computing system for scheduling functions on a compute node within a cluster computing network, as per an example.

FIG. 1 illustrates an example system 102 for scheduling functions on a compute node within a cluster computing network. As may be understood, the example system 102 may be a scheduling node within such a cluster computing network. The example system 102, amongst other functions, may schedule functions to be executed on one of the compute nodes within a cluster computing network (not shown in FIG. 1). The cluster computing network may include a plurality of compute nodes, each of which may be connected to each other and the scheduling node (such as the system 102). The compute nodes may in turn include a processing unit or a plurality of processing unit for executing the scheduled tasks, The duster computing network may implement a High-Performance Computing (HPC) machines for processing computationally extensive and complex functions. Such functions may be implemented as part of complex software-enabled systems which may be configured or programmed for performing specific functions pertaining to a certain application area. Examples of such application areas include, but are not limited to, biological gene modelling, sampling of radio astronomical data, sampling of space environments received from a satellite, and autonomous vehicle. The described approaches may be used for other example applications which rely on, and process, large volumes of data. Such example applications will also be present within the scope of the claimed subject matter.

The system 102 includes a processor 104, and a machine-readable storage medium 106 which is coupled to, and accessible by, the processor 104. The system 102 may be implemented in any computing system, such as a storage array, server, desktop or a laptop computing device, a distributed computing system, or the like. is Although not depicted, the system 102 may include other components, such as interfaces to communicate over the network or with external storage or computing devices, display, input/output interfaces, operating systems, applications, data, and the like, which have not been described for brevity.

The processor 104 may be implemented as a dedicated processor, a shared processor, or a plurality of individual processors, some of which may be shared. The machine-readable storage medium 106 may be communicatively connected to the processor 104. Among other capabilities, the processor 104 may fetch and execute computer-readable instructions, including instructions 108, stored in the machine-readable storage medium 106. The machine-readable storage medium 106 may include non-transitory computer-readable medium including, for example, volatile memory such as RAM (Random Access Memory), or non-volatile memory such as EPROM (Erasable Programmable Read Only Memory), flash memory, and the like. The instructions 108 may be executed to schedule a set of tasks based on their priority.

In operation, the processor 104 may fetch and execute instructions 108. For example, the instructions 110 may be executed to initially identify a function that is to be invoked. The function may be one of the many other functions which may be implemented by a software-enabled system which relies on the cluster computing network for processing operations. The function thus identified may in turn include a set of tasks that are to be performed. The set of tasks are sequenced in such a manner such that they form a sequenced functional flow of a series of computing operations or processes. The tasks may further be linked to another interdependent task within the set of tasks. In an example, the function may be identified based on a priority value association with the function.

Once the function is identified, the instructions 112 may be executed to retrieve a cascaded priority mapping comprising a series of priority value nodes. The priority value nodes, similar to the tasks, are also sequentially arranged. Each of the priority value node may be associated with or assigned to a task, which may be one of the multiple tasks within a set of tasks. As a result, the priority value node may specify a priority value, which in turn, represents the priority value of the specific task. The instructions 112 may further be executed to process the cascaded priority mapping to determine the priorities of the multiple tasks that are to be performed.

Once the cascaded priority mapping is processed, the instructions 114 may be executed for scheduling the set of tasks across a cluster of compute nodes in the cluster computing network. In an example, one or more tasks may further include nested sub-tasks. The nested sub-tasks may be considered as processes which form the constituting steps for performing the task within which the sub-tasks are nested. For specifying the priority values for such sub-tasks, the cascaded priority mapping may further include a priority chain linked to or associated with another the priority value node. In the context of the present example nodes of the priority chain may correspond to the sub-tasks. In an example, the system 102 may schedule the tasks and their corresponding sub-tasks based on the priority values specified by the cascaded priority value nodes and their associated priority chains.

Figure 2:
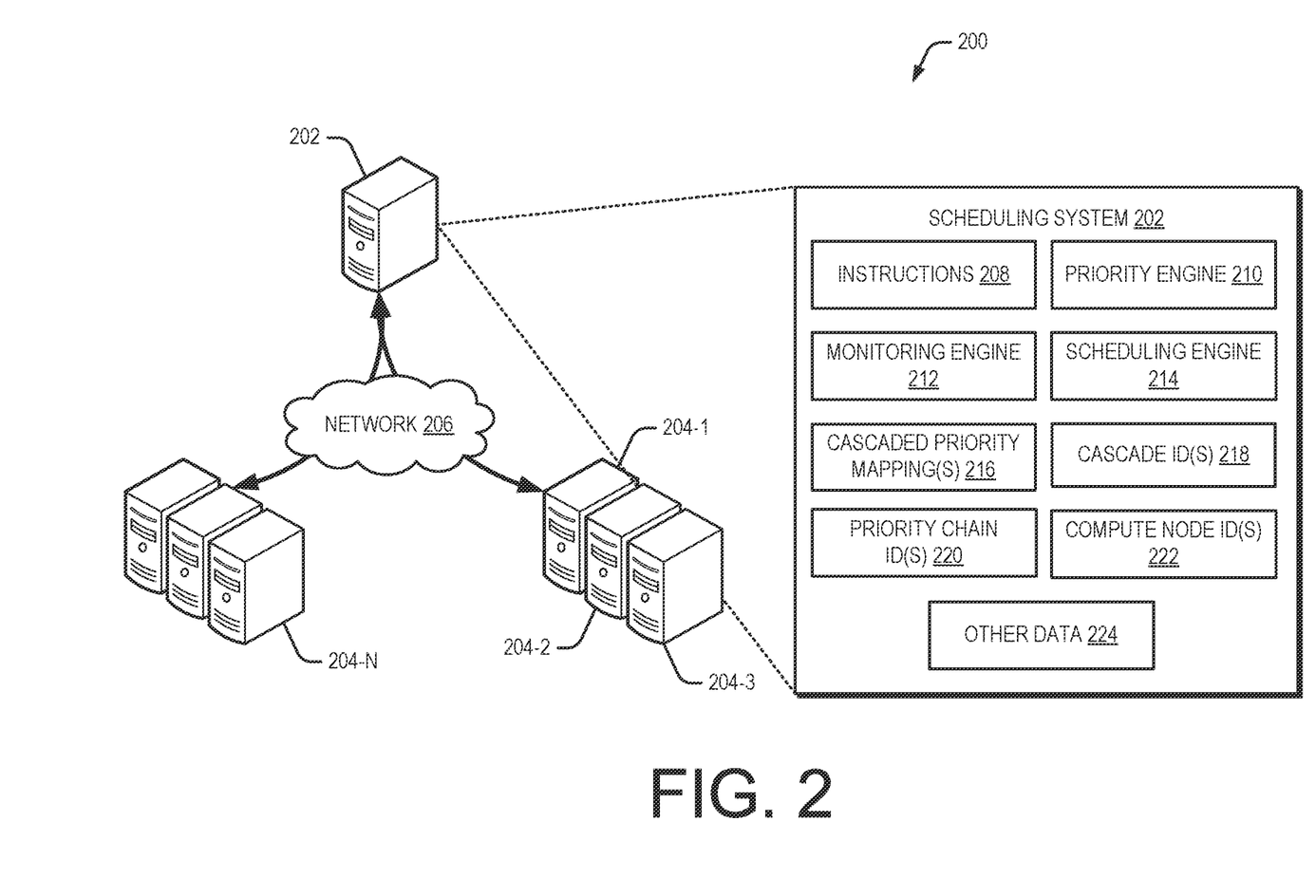
FIG. 2 illustrates a cluster computing environment comprising a scheduling system, as per an example.

FIG. 2 illustrates a cluster computing environment 200 comprising a scheduling system 202. The cluster computing environment 200 (referred to as environment 200) may be implemented as a High-Performance Computing (HPC) cluster. The environment 200 may include a scheduling system 202 (referred to as the system 202) and a plurality of compute nodes 204-1, 204-2, . . . , 204-n (collectively referred to compute nodes 204). The compute nodes 204 may be any processor-based system with either a single processor core of multiple processor cores, or any type of processing unit. The compute nodes 204 may further include a memory (not shown in FIG. 2).

The system 202 and the compute nodes 204 may be interconnected with each other through network 206. In an example, the network 206 may be high speed network which allows high speed communication between the system 202 and the compute nodes 204. The network 206 may be a private network or a public network and may be implemented as a wired network, a wireless network, or a combination of a wired and wireless network. The network 206 may also include a collection of individual networks, interconnected with each other and functioning as a single large network, such as the Internet. Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), Long Term Evolution (LTE), and Integrated Services Digital Network (ISDN).

As will be described further, the system 202 determines and schedules certain functions which are to be performed by a compute node, say compute node 204-1 or a group of nodes from amongst the compute nodes 204. In an example, the system 202 schedules the functions to be implemented based on a priority which may be associated with such functions. The system 202, similar to the compute nodes 204, may further include a processor or memory (not shown). The system 202 may further include an interface which enables the system 202 to be communicatively coupled to one or more compute nodes 204 through the network 206.

The system 202 may further include instructions 208, a priority engine 210, a monitoring engine 212, and a scheduling engine 214. In an example, the instructions 208 are fetched from a memory and executed by a processor included within the system 202 to invoke the priority engine 210, the monitoring engine 212, or the scheduling engine 214. Each of the priority engine 210, the monitoring engine 212, and the monitoring engine 212 (collectively referred to as engines) may be implemented as a combination of hardware and programming, for example, programmable instructions to implement a variety of functionalities. In examples described herein, such combinations of hardware and programming may be implemented in several different ways. For example, the programming for the engines may be executable instructions, such as instructions 208. The instructions 208 may be stored on a non-transitory machine-readable storage medium which may be coupled either directly with the system 202 or indirectly (for example, through networked means). In an example, the engines may include a processing resource, for example, either a single processor or a combination of multiple processors, to execute such instructions. In the present examples, the non-transitory machine-readable storage medium may store instructions, such as instructions 208, that when executed by the processing resource, implement the engines. In other examples, the engines may be implemented as electronic circuitry.

The priority engine 210 may further assign and allocate a priority to one or more functions which may be executed onto any one of the compute nodes 204. The functions that are to be executed may further include a plurality of tasks. The tasks may be sequenced such that they form a functional flow, with a particular task being linked or associated with a preceding task or a following task. In such a case, one of the tasks may be executed after another certain task may have completed execution. In certain cases, the tasks may further include sub-tasks which may be nested within their respective parent tasks. Over a period of time, the tasks and the sub-tasks may be executed to eventually implement the function under consideration. The order in which the tasks (or the nested sub-tasks) are performed may be based on priorities which may be associated with the individual tasks and the sub-tasks. The priority may determine execution of which task takes precedence over the other tasks.

In an example, the priority engine 210 may define priority of the tasks (and their nested sub-tasks) through a cascaded priority mapping(s) 216. The cascaded priority mapping(s) 216 may define an association of a priority value with a corresponding task. The cascaded priority mapping(s) 216, in the context of the present subject matter may be represented in a structured cascaded arrangement of priority value nodes (hereinafter referred to as priority nodes). Each of the priority nodes in such a cascaded arrangement may correspond to a certain task.

Figure 3:
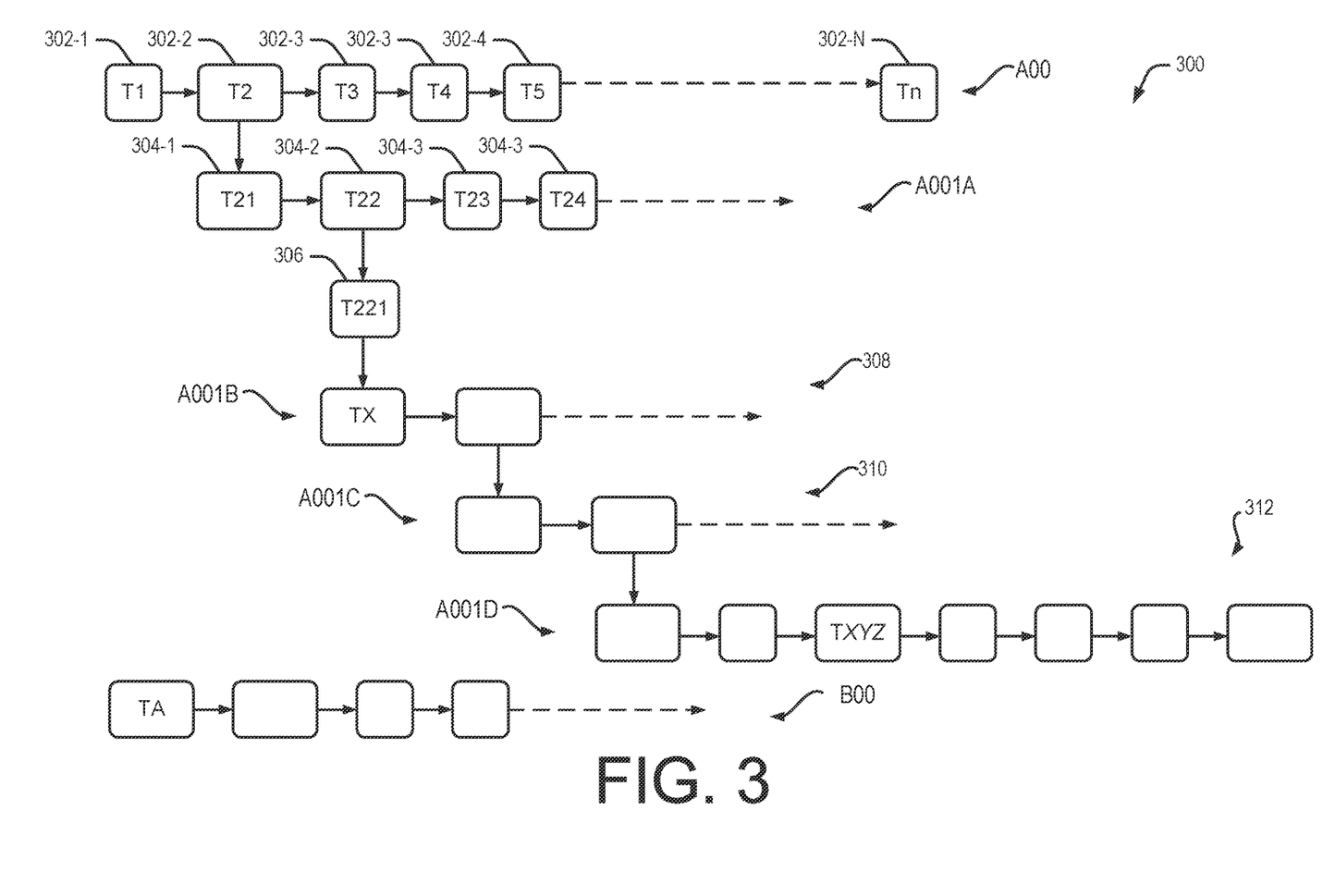
FIGS. 3-4 illustrates an example priority cascaded mapping with corresponding tasks and priority chain values, as per an example.
Figure 4:
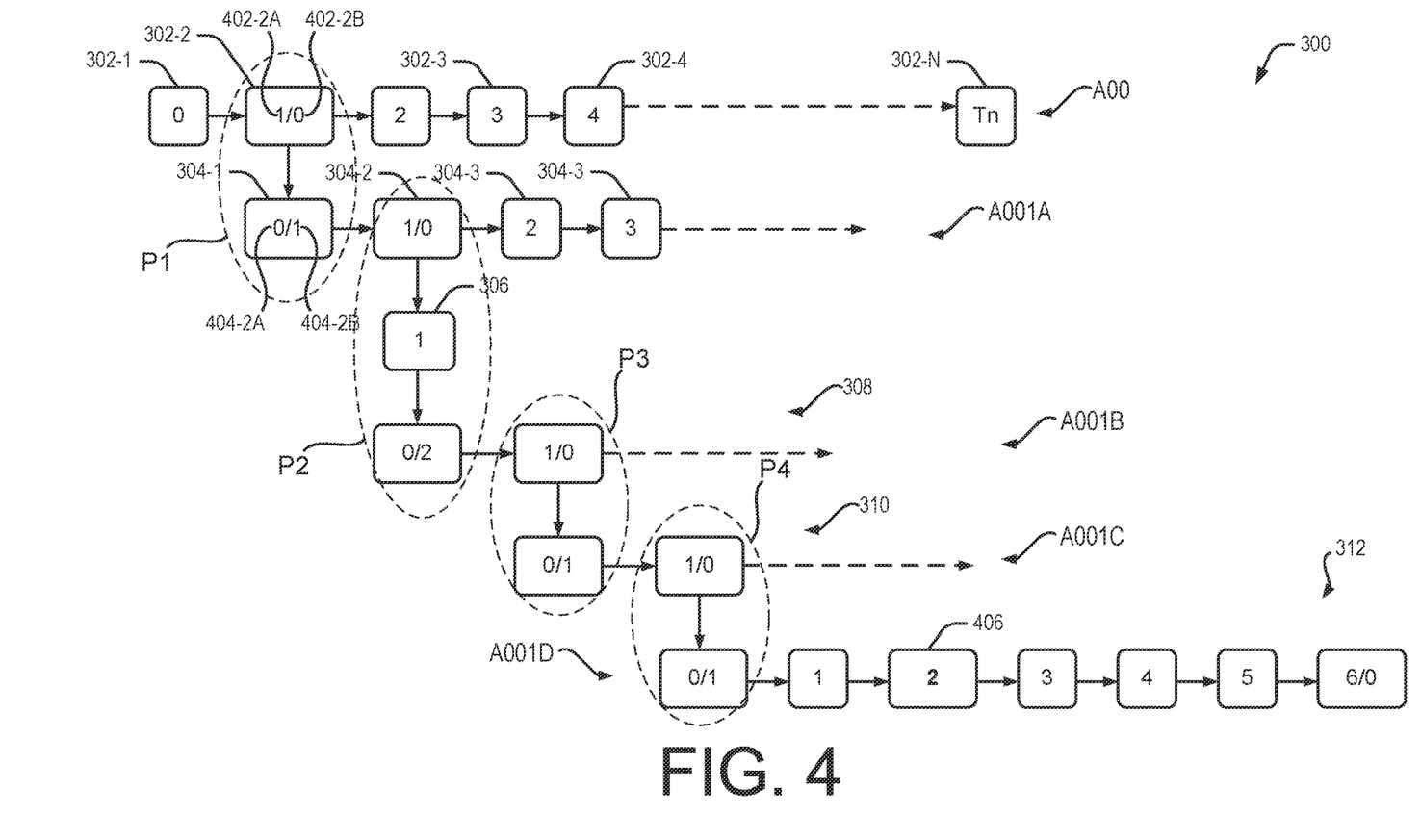

An example cascaded priority mapping(s) 216 is further illustrated in FIGS. 3-4. FIG. 3 depicts a cascaded arrangement 300 of priority values which are provided for multiple priority value nodes, The arrangement includes a plurality of cascaded priority nodes corresponding to a first cascade designated as first cascades A00, A001A, A001B, A001C, and A001D. The arrangement 300 also depicts a second cascade B00, similar to the cascade A00. The cascade A00 may correspond to a first function while the cascade B00 may correspond to a second function which is to be implemented through execution of a plurality of tasks. Further explanation is provided with respect to the cascade A00 and their corresponding cascaded priority nodes. The same may be applicable for the cascade BOO.

The cascade A00 may include a plurality of priority nodes 302-1, 302-1, . . . , 302-n. Each of the priority nodes 302-1, 302-1, . . . , 302-n may be linked to multiple tasks forming constituent steps of a first function. For example, the priority node 302-1 may be associated with task T1, while priority node 302-2 may be associated with task T2, and so on. In an example, priority engine 210 may define a cascaded priority mapping(s) 216 such that the arrangement of the priority nodes 302 follow an order which is similar to the order in which the tasks are to be performed.

Each of the priority nodes 302-1, 302-1, . . . , 302-n (collectively referred to as priority nodes 302) within the cascaded priority mapping(s) 216 may be arranged recursively in the form of a hierarchical tree structure. In such a case, each of the priority nodes 302 may define priorities for a task, e.g., task T1 (through the priority node 302-1), to which the priority node is associated with. The priorities for the tasks is may be specified through values attributed to the priority value nodes (as explained further in conjunction with FIG. 4). Since each of the priority value nodes (e.g., priority nodes 302) are associated with a priority value, at the time of scheduling, the set of tasks or sub-tasks may be scheduled based on the priority value associated with the priority value node by the scheduling engine 214 of the scheduling system 202.

The cascaded priority mapping(s) 216 may include further priority nodes 304-1, 304-1, . . . , 304-n (as part of cascade A001A), and yet further priority nodes 306-1, 306-1, . . . , 306-n (as part of cascade A001B). The example as depicted in FIG. 3 depicts multiple other priority nodes, for example, priority nodes 308, 310, and 312. Each of the priority nodes 302, 304, 306, 308, 310, and 312, are arranged in layers or cascades.

In an example, each layer or cascade (i.e., cascades A001A, A001B, A001C, and A001D) define priorities, for a set of tasks, through serially connected priority value nodes, namely, priority nodes 302, 304, 306, 308, 310, and 312. Successive layers, formed through cascades A001A, A001B, A001C, and A001D) may define further priority value nodes which may be linked to sub-tasks of tasks of the preceding layer. The cascaded priority mapping(s) 216 may further continue in the same manner and include multiple such layers forming succession of further sub-tasks, with such further sub-tasks linked to their respective parent tasks in the preceding layer. As a result, such multiple layers of priority values nodes successively linked to tasks and further priority value nodes linked to sub-tasks form a hierarchical cascaded arrangement. The successive linking of the priority values of the tasks and its constituent sub-tasks through a priority chain. The multiple layers of the priority value nodes along with the priority chains may be considered as collectively forming the cascaded priority mapping.

It may be the case that one of the tasks, say task T2 which corresponds to the priority node 302-2 (as shown in FIG. 3), may further include a plurality of sub-tasks, say tasks T21, T22, . . . , T2n. In an example, the priority engine 210 may further provide logical association of another priority node which originates from or is associated with one of the parent nodes. In the context of the example illustrated in FIG. 3, the priority engine 210 may further provide a priority node which is logically associated with the priority node 302-1. The additional priority node is now depicted as priority node 304-1. The priority node 304-1 may correspond to one of the sub-is tasks which are a part of the parent task (i.e., the task T2). If the task T2 includes further sub-tasks, the priority engine 210 may provide further add such priority nodes 304-2, 304-3, . . . , 304-n and link the multiple tasks (e.g., T21, T22, etc.). As would be appreciated, the priority nodes 304-1 304-2, 304-3, . . . , 304 -n (collectively referred to as the priority nodes 304) form the cascade A001.

As described previously, the priority node 304-1 may be logically linked to the parent task T2 (which in turn corresponds to the priority node 302-2) by the priority engine 210. The logical association of the priority nodes (such as the priority node 304-1) of one cascade (such as the cascade A001), with another priority node (such as the priority node 302-2) branching off from another parent cascade (such as the cascade A00) is referred to and depicted as a priority chain P1. In the present example, the priority node 304-1 may be associated with a task T21 with priority nodes 304-2, 304-3, . . . , 304-n to tasks T22, T23, . . . , T2n, Further cascades, i.e., cascades A001B, A001C, and so on, may further be designed or implemented for further sub-tasks. For example, the cascade A001B may provide priority nodes 306 which correspond to sub-tasks, such as the task T22. The logical extensions associating task T22 to its further sub-tasks form a priority chain P2. The association of the tasks and the priority nodes, such as priority nodes 302, 304, 306, and such, may be performed by the priority engine 210 in response to instructions from a system designer for designing and implementing the functions. In this manner further cascades and nested priority chains may be realized for complex systems which implement interdependent and multitude of nested sub-tasks.

The various priority nodes in the different cascades as well as the priority chain may further specify a priority value. The different priority nodes corresponding to the different tasks thus provide a priority for the different tasks. FIG. 4 provides an illustration depicting the different priority values which may be associated with different priority nodes across a plurality of cascades (such as cascades A00, A001A, A001 B, etc.) and priority chains (such as priority chains P1 and P2).

For example, for the cascade A00, the priority engine 210 may associate the different priority nodes 302 with different priority values. As depicted, the priority node 302-1 is associated with a '0' priority, with the other priority nodes, such as nodes 302-2, 3, . . . , N being associated with priority values, such as '1', '2', '3', . . . , 'N'. In an example, it may imply that the tasks with a lower priority value (and thereby depicting a higher priority) may take precedence when they are to be scheduled and executed at any one of the compute nodes 204. The illustrated example depicts that task T1 corresponding to the priority node 302-1 is associated with a priority value '0', with other tasks T2, T3 and so on, being associated with priority values '1', '2', and so on, by the priority engine 210. The priority values for the tasks corresponding to the cascade A00 are denoted as values 402-1, 2, 3, . . . , N. It may be noted that the priority values thus associated with the tasks is only indicative. Other values denoting the priority of the different tasks are also possible without deviating from the scope of the present subject matter.

As also described in conjunction with FIG. 3, task T2 (associated with the priority node 302-2) may further be linked, say by the priority engine 210, to the priority node 304-1 thus forming the priority chain P1. Many other priority nodes 304 may extend from the priority node 304-1 to form the cascade A001A. It is pertinent to note that in such a case, the priority node 304-1 may be utilized to prescribe multiple priority values. For example, a first priority value '1' (denoted as value 402-2A) may be used to denote the order of priority of task T2 when it is to be performed as part of the cascade A00, and a second priority value '0' (denoted as value 402-2B) for defining its priority within the priority chain P1. In a similar manner, the task T21 may be associated with its respective priority values '1' and '0' (denoted as values 404-1A and 404-1B). In this case, the priority value '1' would define priority of task T21 as a part of the priority chain P1, whereas priority value '0' would define its priority value of task T21 as a part of the cascade A001A. In this manner, respective first and second priority values may be attributed to the priority nodes which may be common between adjoining cascades (such as between cascades A00 and A001A) and a priority chain (such as priority chain P1). Such other priority nodes are depicted in FIG. 4. In the manner as described above, different priority values may be attributed to a variety of different tasks within a plurality of function being implemented by complex systems. In an example, the priority values being attributed to the priority nodes may be performed by the priority engine 210. The association of the priority values may be performed once the plurality of functions for the complex software-enabled systems are determined and designed.

In an example, the priority engine 210 associates the cascades within the cascaded priority mapping(s) 216 with a unique identifier by the priority engine 210. The unique identifier may be stored and maintained as cascade ID(s) 218. The cascade ID(s) 218 may include a common base identifier corresponding to a parent cascade with a listing identifier, The common base identifier is such that it is same for all cascaded priority nodes within the same cascade, say a first cascade. Table 1 below provides a list of example cascade ID(s) 218.

TABLE 1

| Cascade Name | Cascade ID(s) 218 |
|---|---|
| A00 | 0x00000001 + i0 |
| A001A | 0x00000001 + i1 |
| A001B | 0x00000001 + i2 |
| A001C | 0x00000001 + i3 |

TABLE 1-continued

| Cascade Name | Cascade ID(s) 218 |
|---|---|
| A001D | 0x00000001 + i4 |
| A001E | 0x00000001 + i5 |
|  | (not shown in FIGS. 3-4) |
| A001F | 0x00000001 + i6 |
|  | (not shown in FIGS. 3-4) |

As depicted in Table 1, the various cascades, e.g., cascades A001A, A001B, and so on, all originate from the cascade A00. In such a case, the cascade ID(s) 218 of the cascade A00 (being the originating cascade) may be depicted with an example base identifier '0x00000001' and a listing identifier 10'. The listing identifier may indicate a level of a given cascade with respect to a first cascade or a base cascade. For example, the listing identifier 10' may be considered as denoting the cascade A00 as a base cascade or an originating cascade for the other example cascades indicated in Table 1. Continuing further, for the cascade A001A the base identifier '0x00000001' remains the same indicating that it corresponds to or is a 'child' cascade of the base cascade A00. Since the cascade A001A is structured as being associated with the base cascade A00, the listing identifier is thus indicated as 'i1'. For subsequent layers or levels of cascade from the base cascade A00, the listing identifier may accordingly change. For example, the cascade A001D would be present at a fourth level with respect to the base cascade A00 as depicted by the listing identifier 'i4'. In an example, the cascade ID(s) 218 for each of the different cascades may be depicted by the following relation:

$$\text{cascade ID(s)} = [\text{base identifier}] + [\text{listing identifier } i(n)]$$

wherein n may denote the level of the cascade under consideration. The different cascade ID(s) 218 depicted in Table 1 are only indicative and should not be construed as limiting the scope of the claimed subject matter in any manner.

Continuing further, similar to the cascades, the priority engine 210 may further provide a unique identifiers for the priority chains, such as the priority chain P1. In an example, the priority engine 210 may store the identifier of the priority chains as priority chain ID(s) 220. The priority chain ID(s) 220 may include a common base identifier corresponding to a parent cascade, a listing identifier which identifies the cascade from which chain under consideration originates from, and position identifier of the chain within the said cascade. For example, the priority chain P1 originates from the priority node 302-2 which is present in the cascade A00. To this end, the listing identifier would be 'i0' corresponding to the cascade A00 with the position corresponding to the priority node 302-2, and hence indicated by 11'. In this manner, the priority chains within the cascaded priority mapping(s) 216 may be associated. A listing of example priority chain ID(s) 220 are depicted in the Table 2 below:

TABLE 2

| Chain Name | Priority chain ID(s) 220 |
|---|---|
| P1 | 0x00000001 + i0 + j1 |
| P2 | 0x00000001 + i1 + j1 |
| P3 | 0x00000001 + i2 + j1 |
| P4 | 0x00000001 + i3 + j1 |
| P5 | 0x00000001 + i4 + j2 |
|  | (not shown in FIGS. 3-4) |
| P6 | 0X00000001 + i4 + j6 |

TABLE 2-continued

| Chain Name | Priority chain ID(s) 220 |
|---|---|
| P7 | (not shown in FIGS. 3-4)<br>0x00000001 + i6 + j1<br>(not shown in FIGS. 3-4) |

In an example, the priority chain ID(s) 220 for each of the different priority chains may be depicted by the following relation:

priority chain ID(s)=[base identifier]+[listing identifier i(n)]+[position identifier j(k)]

wherein n may denote the level of the cascade under consideration and k may denote the position of the priority node within the 'nth' level cascade. In an example, the 'i' and 'j' bases used for implementing the cascade ID(s) 218 and the priority chain ID(s) 220 may be complex numbers. It may be noted that the above approaches for providing identifiers for the cascades and the priority chains are only indicative. Other examples for generating and associating the unique identifiers for the cascades and the priority chains may be adopted without deviating from the scope of the present subject matter.

In an example, the cascade ID(s) 218 and the priority chain ID(s) 220 may be utilized by the priority engine 210 for determining the cascade or priority chain to which may a task belong to without scanning the entire cascaded priority mapping(s) 216. For example, the cascade ID(s) 218 may be utilized for identifying the cascade and the priority value for the priority node under consideration. In a similar manner, the priority engine 210 may process the priority chain ID(s) 220 to determine the priority value based on the cascade and the priority chain within which a given task may be present.

In an example, the cascade ID(s) 218 and the priority chain ID(s) 220 may be in the form of an index which may then be utilized by the priority engine 210 to derive the cascade-priority chain hierarchy as discussed above. In another example, the priority engine 210 may utilize the index to sequence the wait of tasks, and prepare queues of such tasks, with a very large task sets with varying priorities.

In an example, the cascaded priority mapping(s) 216 may be implemented as a hierarchical tree, an example of which includes a Van Erode Boas tree (vEB tree). It may be noted that the manner in which the priority cascade mapping are implemented are only indicative. Other example implementations of priority cascade mappings are also possible without deviating from the scope of the present subject matter. With the priority values for different tasks defined through the cascaded priority mapping(s) 216, the system 202 may accordingly schedule appropriate tasks for execution at any one or more of the compute nodes 204. For example, the scheduling of the tasks may be based on a number of parameters. The tasks may be scheduled such that they occur in a predefined sequence or may be scheduled in response to detection of a certain event.

For example, complex software-enabled systems may be regularly scheduling tasks or monitoring certain conditions based on which other tasks may be scheduled. In an example, the monitoring engine 212 within the system 202 may be monitoring for signals, messages, or any indication that may convey that a certain event has occurred. In the context of complex software-enabled system such as an autonomous vehicle, an example of such an event may include detection of an obstruction or an object that may have suddenly appeared in the path of the moving vehicle. Another example may include detection of a malfunction within a building complex that may have occurred due to an undesirable event such as a fire. Such events may entail performing a large number of tasks. The events as depicted are only provided as examples and are not to be considered as the only examples of the claimed subject matter. Other such examples and complex software-enabled systems may also be used without deviating from the scope of the present subject matter.

Returning to the operation, the monitoring engine 212 may monitor for occurrence of certain triggering event. Based on the detection of such a triggering event, a task or a set of tasks may be performed. Once the set of tasks to be performed is determined, the priority engine 210 may retrieve a corresponding cascaded priority mapping(s) 216. The priority engine 210 may then process the cascaded priority mapping(s) 216 to determine a priority value for task that is to be performed. As discussed previously, the cascaded priority mapping(s) 216 may further include a plurality of cascades, such as cascade A00, A001A, A0011B, and so on, with each cascade providing a plurality of priority nodes, such as nodes 302, 304, and so on, respectively. In an example, the cascaded priority mapping(s) 216 may be implemented as a direct acyclic graph.

Based on the task that is to be performed, a corresponding priority node is determined. The present example is now explained in the context of task T2. However, this explanation will apply for any other tasks. Returning to the present example, the priority engine 210 may identify priority node 302-2 as the priority node corresponding to the task T2. With the priority node 302-2 thus identified, the priority engine 210 may determine a priority value '1' (indicated by the value 402-2A) for the task T2. Considering that the complex software-enabled system may implement a plurality of tasks, the priority engine 210 may determine the priority values of other tasks as well. Depending on the priority values of such other tasks, certain tasks may be prioritized over other tasks. For example, between task T2 and tasks T3, T4, and T5, the priority engine 210 may determine the priority of task T2 to be higher than the priority of other tasks. Accordingly, T2 may be prioritized for execution prior to tasks T3, T4, and T5.

Complex software-enabled systems may implement certain tasks that may have corresponding sub-tasks. For example, detection of an obstruction on a roadway may involve determining size, shape, motion, surrounding environment, presence of other vehicular traffic, or other parameters, for the systems to take the appropriate corrective action. In such a case, completion of such sub-tasks would is result in the completion of the tasks to which such sub-tasks correspond to. As described above, the example task T2 may further include a plurality of sub-tasks, such as tasks T21, T22, and so on. The cascaded priority mapping(s) 216 represents the association between the task T2 and its corresponding sub-tasks (referred to as child tasks) through priority chain P1. The priority chain P1 links the priority node 302-2 (in the cascade A00) with the priority node 304-1 which is present in the cascade A001A. The priority node 304-1 may specify a priority value for the task T21. In a similar manner, priority nodes 304-2, 3, . . . . N may specify the priority values for the other sub-tasks T22, T23, . . . , T2$n$. On determining that the sub-tasks T21, T22, . . . , T2$n$ are to be performed, the priority engine 210 may accordingly retrieve the priority values defined for the priority nodes 304-1, 2, 3, . . . , N.

In this manner, the priority engine 210 may traverse and determine the priority values for all tasks (including the sub-tasks or further sub-tasks) that are to be performed. In an example, the priority engine 210 may determine the priority node to be checked based on one of the cascade ID(s) 218 and priority chain ID(s) 220. Once the priority node for the corresponding tasks is determined, the corresponding priority value may be obtained.

With the priority value thus obtained, the scheduling engine 214 may accordingly then schedule the tasks for execution at any one of the compute nodes 204. In an example, the scheduling engine 214 may determine a scheduling list to check which of the compute nodes 204 may be utilized for the tasks (Le., the task T2, and its sub-tasks T21, T22, ..., T2n). In an example, the scheduling engine 214 may identify the compute nodes 204 based on the compute node ID(s) 222. Based on the compute node ID(s) 222, the scheduling engine 214 may accordingly schedule the tasks for execution based on their priority values, Once execution of such prioritized tasks is complete, the scheduling engine 214 may schedule other tasks for execution at the compute nodes 204.

It may be noted that the present example has been explained considering the occurrence of a certain event. However, the same mechanism and process may be followed for tasks the ordering of which has been defined. In such cases, priority values of such tasks may be determined. If their priority is higher as compared to other tasks, then execution of such tasks may take precedence over the execution of other tasks. The priority engine 210 may then traverse through the cascaded priority mapping(s) 216, determine priority of the tasks and accordingly cause the tasks to be scheduled by the scheduling engine 214 at the compute nodes 204, As explained, a single task or process within a set of tasks may be associated with priority values represented in a nested cascade-chain-cascade arrangement. For example, for one of the tasks T23 (which corresponds to the priority node 304-3 as depicted in FIGS. 3-4) may be presented as a series of values, e.g., 1-1-2, which correspond to the cascade-chain-cascade arrangement within the cascade A001A, as opposed to attributing such tasks to single priority values such as 1, 2, or 3. As also described previously, the priority values may be represented through identifiers as depicted in Table 1 and Table 2. In an example, the priority engine 210 may generate refreshable hash table with complex numbers.

In an example, the cascaded priority mapping(s) 216 may be represented in the form a direct acyclic graph. An example is now described with respect to an example task TXYZ which corresponds to the priority node 406 (as depicted in FIG. 4). For the current example, the priority value for the priority node 406 is '2'. For the priority node 406, a cascade identifier corresponding to the same is '0×00000001 i4'. However, the priority node 406 is traversable from the priority node 302-1 by traversing through all the intervening cascades as well as the priority chains. In the present instance, priority node 406 may be reached by following a logical path from the cascade A00 which then proceed to priority chain P1. Thereafter, path may branch off to the cascade A001A which then proceeds to priority chain P2. From thereon, it moves to cascade A001B, priority chain P3, cascade A001C, to priority chain P4 before reaching priority node 406. In an example, the priority engine 210 may generate a direct acyclic graph based on path between the initial priority node, i.e., priority node 302-1 to the priority node 406. The direct acyclic graph may be used for looking up the appropriate priority values.

In an example, the direct acyclic graph (DAG) may be a reconfigurable DAG that in turn may be utilized by the priority engine 210 for managing the priorities defined at various priority nodes within the cascades and priority chains. The priority engine 210 may modify one or more paths within the DAG for creating new tasks or paths. Whenever a new task with a cascade or a priority chain is to be created, the priority engine 210 may create a new node at the appropriate node level. For example, a new priority node may be created between A001B cascade and A001C cascade. The new node may be positioned based on the order of previously existing priority values. If the priority value is a numerical value which lies between the highest and lowest priority is values, the new priority value may be positioned in between certain priority nodes. If it greater than the highest numerical value, it may be accommodated after the last priority node within the cascade, under consideration.

Figure 5:
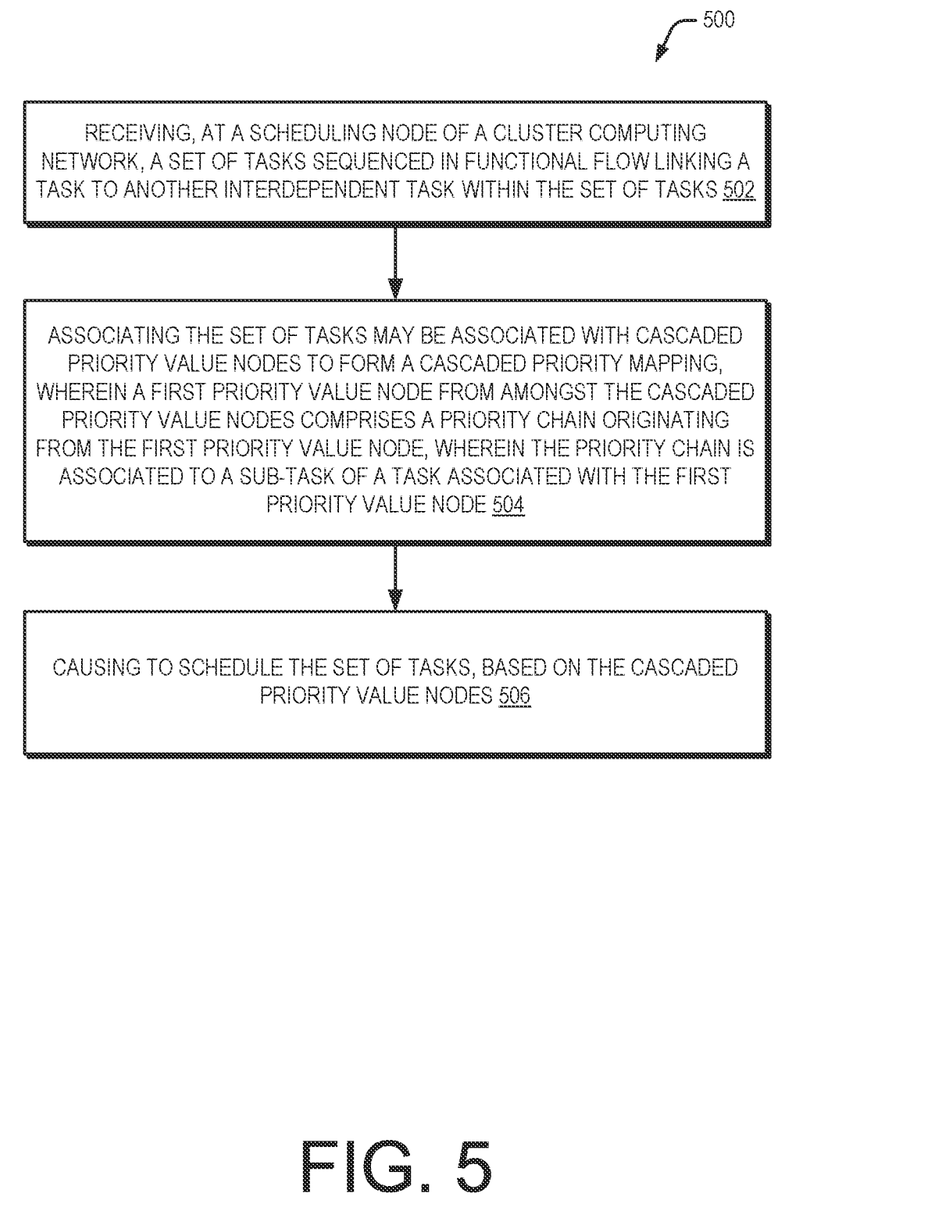
FIG. 5 illustrates a method for associating priority chain values with a set of tasks, as per an example.
Figure 6:
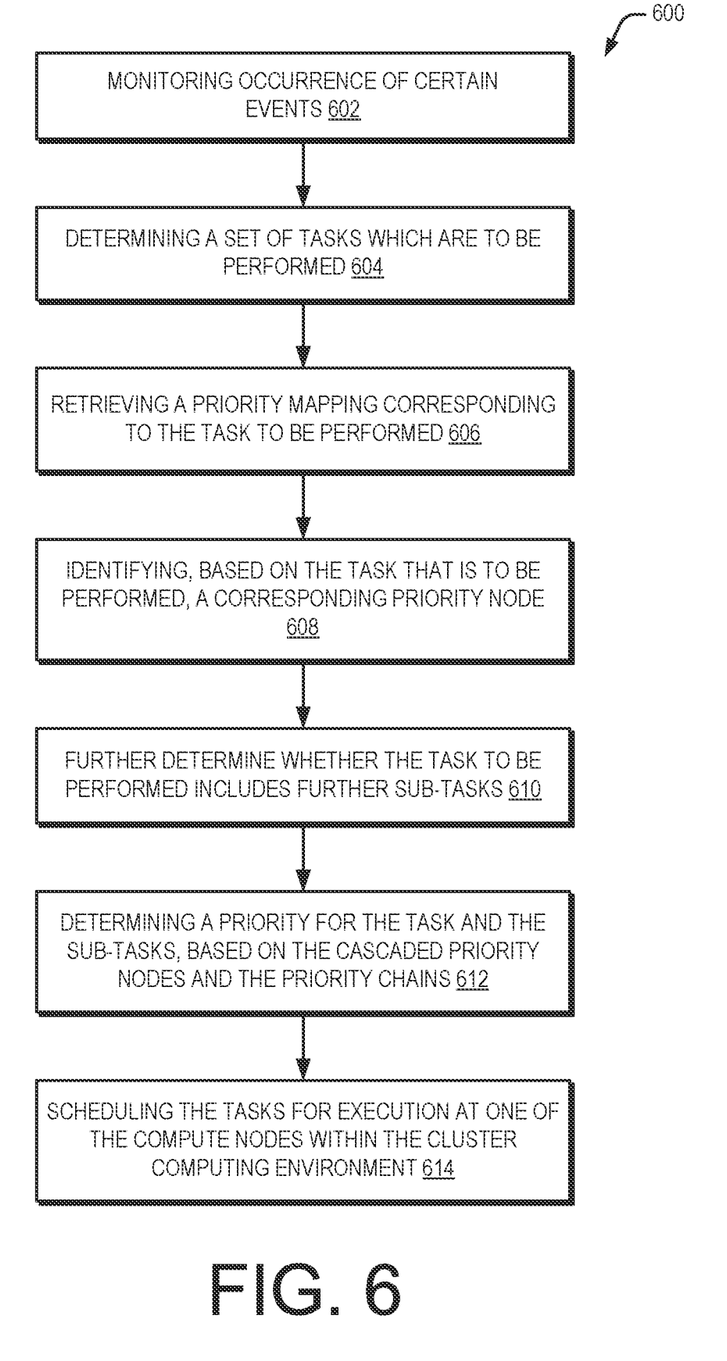
FIG. 6 illustrates another example method for determining priority of a certain task and accordingly scheduling the task at a compute node, within a cluster computing environment.

FIGS. 5-6 illustrate example methods 500-600 for associating priority values with a set of tasks. The order in which the above-mentioned methods are described is not intended to be construed as a limitation, and some of the described method blocks may be combined in a different order to implement the methods, or alternative methods.

The above-mentioned methods may be implemented in a suitable hardware, computer-readable instructions, or combination thereof. The steps of such methods may be performed by either a system under the instruction of machine executable instructions stored on a non-transitory computer readable medium or by dedicated hardware circuits, microcontrollers, or logic circuits. For example, the methods may be performed by a scheduling system, such as system 202. In an implementation, the methods may be performed under an "as a service" delivery model, where the system 202, operated by a provider, receives programmable code.

Herein, some examples are also intended to cover non-transitory computer readable medium, for example, digital data storage media, which are computer readable and encode computer-executable instructions, where said instructions perform some or all the steps of the above-mentioned methods.

In an example, the method 500 may be implemented by the scheduling system 202 for defining priority values for a set of tasks to be implemented by a complex software-enabled system. At block 502, a task group comprising a set of tasks may be received. In an example, the set of tasks may be received by a scheduling system 202 of a duster computing environment 200. The set of tasks thus received may be such that the tasks may be sequenced in a functional flow. The functional flow links one task to another following task.

At block 504, the set of tasks may be associated with cascaded priority nodes. For example, the priority engine 210 within the system 202 may associate the set of tasks with the cascaded priority nodes. In an example, the priority nodes are linked with each other corresponding to the sequenced flow of the set of tasks. The cascaded priority nodes may further include a priority chain which may originate from one of the priority node. The priority chain is such that it corresponds to a sub-task of a task with which it is associated.

At block 506, scheduling of the set of tasks, based on the cascaded priority nodes, may be caused. The cascaded priority nodes (which correspond to a task from amongst the set of tasks) may specify priority value for the task to which the priority node corresponds to. In an example, once the priority values for the tasks are determined, the scheduling engine 214 may schedule the tasks at the compute nodes 204 for execution based on their priority.

The priority values have been defined through the structured arrangement of priority nodes may be referred to as the priority cascaded mappings. In an example, these mappings may be maintained and stored by the system 202 as cascaded priority mapping(s) 216. Based on the cascaded priority mapping(s) 216, certain tasks may be scheduled by the scheduling engine 214 for execution by any one of the compute nodes 204 within the cluster computing environment 200. These approaches are further explained in conjunction with FIG. 6.

FIG. 6 illustrates another example method 600 for determining priority of a certain task and accordingly scheduling the task at a compute node within a cluster computing environment. The priority associated with the task may be determined through a mapping of cascaded priority values. Based on the present approaches as described in the context of the example method 600, a scheduling node of a cluster computing network may determine to which compute node may a given task be scheduled. These and other examples are explained in the context of the cluster computing environment 200 and a scheduling system 202 as depicted in FIG. 2.

At block 602, occurrence of certain events may be monitored. For example, a complex software-enabled system may monitor certain operational conditions or parameters to determine whether a certain task is to be performed in response to the presence of such conditions or parameters. The complex software-enabled system may communicate a message or a similar indication to the scheduling system 202 within a cluster computing network, such as the cluster computing environment 200. In an example, such a message may be received by the monitoring engine 212 of the system 202. As example of detection of such an event includes, but is not limited to, obstruction detection on a roadway in the path of an autonomous vehicle.

At block 604, a set of tasks which are to be performed are determined. For example, based on the detection of a predefined conditions or parameters, the monitoring engine 212 may further identify a task or a set of tasks that may be performed. The tasks may be such that they are arranged or ordered in a functional flow. The functional flow links one task to another following task. It is also possible that certain tasks within the set of tasks, may further include a plurality of sub-tasks. The sub-tasks may be considered as child tasks associated with their corresponding parent tasks, Examples of such tasks may include functions implemented by complex software-enabled systems, such as detection of an obstruction on a roadway, collision detection, detecting presence of other vehicular traffic, and so on.

At block 606, a priority mapping corresponding to the task to be performed, may be retrieved. In an example, the priority mapping may in the form of a priority cascaded mapping, such as the cascaded priority mapping(s) 216. The cascaded priority mapping(s) 216 may define an association of a priority value with a corresponding task. The cascaded priority mapping(s) 216, in the context of the present subject matter may be represented in a structured cascaded arrangement of priority nodes. Each of the priority nodes in such a cascaded arrangement may correspond to a certain task. For example, the cascaded priority mapping(s) 216 may further include a plurality of cascades, such as cascade A00, A001A, A001B, and so on, with each cascade providing a plurality of priority nodes, such as nodes 302, 304, and so on, respectively. Each of the priority nodes 302-1, 302-1, . . . , 302-n (collectively referred to as priority nodes 302) may correspond to a number of tasks that constitute a first function. For example, the priority node 302-1 may correspond to task T1, which priority node 302-2 may correspond to task T2 and so on. In an example, priority engine 210 may define a cascaded priority mapping(s) 216 such that the arrangement of the priority nodes 302 follow an order which is similar to the order in which the tasks for the first function may be performed. In an example, one of the tasks, say task T2 which corresponds to the priority node 302-2 (as shown in FIG. 3), may further a plurality of sub-tasks, say tasks T21, T22, . . . , T2n.

At block 608, based on the task that is to be performed, a corresponding priority node is identified. For example, the priority engine 210 may determine the corresponding priority node based on the task that is to be performed. With reference to the example depicted in FIGS. 2-4, may identify priority node 302-2 as the priority node corresponding to the task T2.

At block 610, a further determination may be made to ascertain whether the task to be performed includes further sub-tasks. In such a case, completion of such sub-tasks would result in the completion of the tasks to which such sub-tasks correspond to. For example, the example task T2 may further include a plurality of sub-tasks, such as tasks T21, T22, and so on. The cascaded priority mapping(s) 216 represents the association between the task T2 and its corresponding sub-tasks (referred to as child tasks) through priority chain P1. The priority chain P1 links the priority node 302-2 (in the cascade A00) with the priority node 304-1 which is present in the cascade A001A.

At block 612, a priority for the task and the sub-tasks may be determined based on the cascaded priority nodes and the priority chains. For example, based on identified priority node 302-2, the priority engine 210 may determine the priority value '1' (indicated by the value 402-2A) for the task T2. Depending on the priority values of such other tasks, certain tasks may be prioritized over other tasks. For example, T2 may be prioritized for execution prior to tasks T3, T4, and T5. The priority node 304-1 may specify a priority value for the task T21. In a similar manner, priority nodes 304-2, 3, . . . , N may specify the priority values for the other sub-tasks T22, T23, . . . , T2n, based on the priority nodes within the priority chain P1. On determining that the sub-tasks T21, T22, . . . , T2n are to be performed, the priority engine 210 may accordingly retrieve the priority values defined for the priority nodes which may be present within the priority chain P1 (i.e., the priority nodes 302-2 and 304-1) and within the cascade A001A which in turn includes priority nodes 304-1, 2, 3, . . . , N. In an example, the priority engine 210 may determine the priority node to be checked based on one of the cascade ID(s) 218 and priority chain ID(s) 220. Once the priority node for the corresponding tasks is determined, the corresponding priority value may be obtained, At block 614, the tasks may be accordingly scheduled for execution at one of the compute nodes within the cluster computing environment. For example, once the priority values have been obtained, the scheduling engine 214 may accordingly then schedule the tasks for execution at any one of the compute nodes 204. In an example, the scheduling engine 214 may determine a scheduling list to check which of the compute nodes 204 may be utilized for the tasks (i.e., the task T2, and its sub-tasks T21, T22, . . . , T2n), In an example, the scheduling engine 214 may identify the compute nodes 204 based on the compute node ID(s) 222. Based on the compute node ID(s) 222, the scheduling engine 214 may accordingly schedule the tasks for execution based on their priority values. Once execution of such prioritized tasks is complete, the scheduling engine 214 may schedule other tasks for execution at the compute nodes 204.

Figure 7:
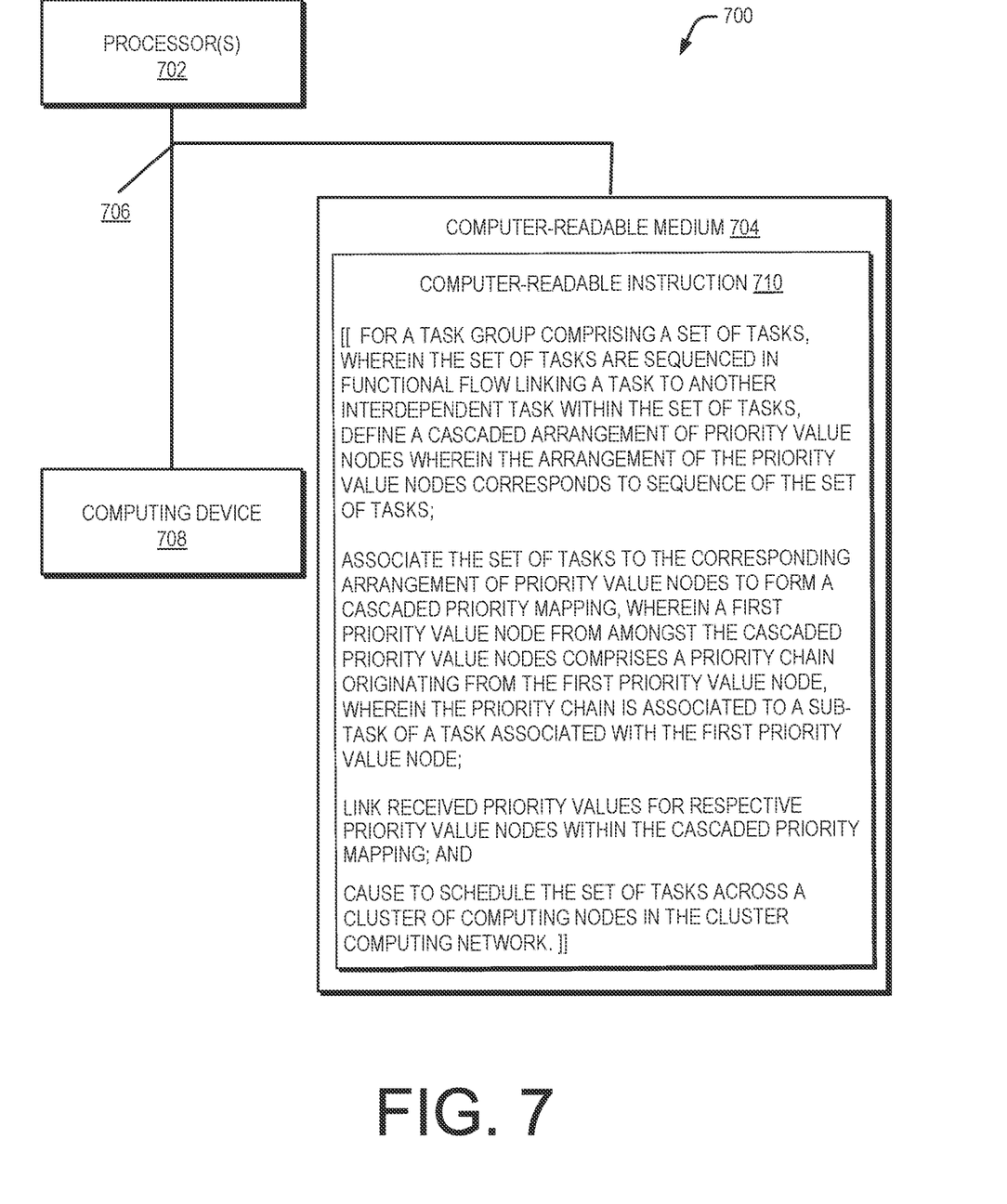
FIG. 7 illustrates a system environment implementing a non-transitory computer readable medium for scheduling tasks on a compute node within a cluster computing environment, as per an example.

FIG. 7 illustrates a computing environment 700 implementing a non-transitory computer readable medium for scheduling tasks on a compute node within a cluster computing environment. In an example, the computing environment 700 includes processor(s) 702 communicatively coupled to a non-transitory computer readable medium 704 through a communication link 706. In an example implementation, the computing environment 700 may be for example, the system 202.

In an example, the processor(s) 702 may have one or more processing resources for fetching and executing computer-readable instructions from the non-transitory computer readable medium 704. The processor(s) 702 and the non-transitory computer readable medium 704 may be implemented, for example, in system 202 (as has been described in conjunction with the preceding figures).

The non-transitory computer readable medium 704 may be, for example, an internal memory device or an external memory device, In an example implementation, the communication link 706 may be a network communication link. The processor(s) 702 and the non-transitory computer readable medium 704 may also be communicatively coupled to a computing device 708 over the network.

In an example implementation, the non-transitory computer readable medium 704 includes a set of computer readable instructions 710 (referred to as instructions 710) which may be accessed by the processor(s) 702 through the communication link 706, Referring to FIG. 7, in an example, the non-transitory computer readable medium 704 includes instructions 710 that cause the processor(s) 702 to define a cascaded arrangement of priority value nodes. The arrangement of the priority value nodes is such that it corresponds to sequence of the set of tasks. The set of tasks are also such that they are represented as a task linked in functional flow to another interdependent task. In an example, priority value nodes (referred to as priority node) may be represented as priority nodes 302-1, 2, . . . , n for the cascade A00.

Thereafter, the instructions 710 may further associate the set of tasks (e.g., tasks T1, T2, . . . , Tn) to the corresponding priority node 302-1, 2, . . . , n. For a certain priority node 302-2 which corresponds to the task T2, may further include a priority chain which originates from the priority node 302-2. The priority chain is utilized for representing sub-tasks for any given tasks. In an example, the priority chain P1 is associated with sub-task T21 (associated with priority node 304-1) which is linked to the task T2 (associated with priority node 302-2). In this manner, the various priority is node may be associated with the set of tasks which are to be implemented to form a priority cascaded mapping. In an example, the cascaded mapping may be in the form of cascaded priority mapping(s) 216 (as depicted in FIGS. 3-4)

With the various tasks defined for each of the priority node within the priority cascaded mappings, such as the cascaded priority mapping(s) 216, the instructions 710 may be further executed to link received priority values for respective priority value nodes within the cascaded priority mapping. For example, the instructions 710 may cause linking of priority values (e.g., priority values 402-2A and 402-2B) with the appropriate priority node (e.g., the priority node 302-2). In this manner, various priority values may be provided and linked to one or more of the priority node within the cascaded priority mapping(s) 216. The instructions 710, with the cascaded priority mapping(s) 216 thus defined, may be executed to cause scheduling of the set of tasks across a cluster of compute nodes in the cluster computing network based on the cascaded priority mapping(s) 216.

Although examples for the present disclosure have been described in language specific to structural features and/or methods, it is to be understood that the appended claims are not necessarily limited to the specific features or methods described. Rather, the specific features and methods are disclosed and explained as examples of the present disclosure.

I claim:

1. A scheduling system comprising:
a processor; and
a machine-readable storage medium comprising instructions executable by the processor to:
execute a set of tasks across a cluster of compute devices in a cluster computing network based on a cascaded priority mapping indicating an execution order of the set of tasks and parallel scalability of the compute devices,
wherein the cascaded priority mapping comprises multiple serially interconnected priority value nodes each defining a respective priority for a task associated with a corresponding priority value node,
wherein the priority value nodes are arranged in successive layers each defining priorities for the set of tasks,
wherein each successive layer denotes a respective priority chain and comprises further priority value nodes linked to sub-tasks of tasks of a preceding layer,
wherein the set of tasks is sequenced in a functional flow that links a preceding task with a following task within the set of tasks,
wherein the cascaded priority mapping further comprises unique layer identifiers for each layer comprising a common base identifier corresponding to a respective layer and a listing identifier denoting a level of the respective layer within the succession,
wherein the common base identifier is the same for all priority value nodes within a same layer,
wherein respective identifiers of the priority chains of the cascaded priority mapping comprise a respective unique layer identifier and a position identifier denoting a position of a respective priority chain within a particular layer, and
wherein the unique layer identifiers along with the identifiers of the priority chains indicate a layer or priority chain to which a particular task belongs absent to requiring a traversal of the cascaded priority mapping.

2. The scheduling system as claimed in claim 1, wherein the cascaded priority mapping comprises a priority chain originating from a first priority value node from amongst the priority value nodes, and wherein the priority chain comprises a subsequent priority value node corresponding to a sub-task of a task associated with the first priority value node.

3. The scheduling system as claimed in claim 2, wherein the cascaded priority mapping comprises a further set of priority value nodes originating from the subsequent priority value node, and wherein the further set of priority value nodes correspond to further sub-tasks corresponding to the task.

4. The scheduling system as claimed in claim 2, wherein the first priority value node is associated with a first priority value and a second priority value, wherein the first priority value denotes a priority value of the task within the layered priority value nodes, and wherein the second priority value is associated with another priority value of the task within the priority chain.

5. The scheduling system as claimed in claim 1, wherein the cascaded priority mapping comprises further levels of layered priority value nodes.

6. The scheduling system as claimed in claim 1, wherein the cascaded priority mapping is implemented as a direct acyclic graph.

7. The scheduling system as claimed in claim 1, wherein the processor is further configured to:
receive a notification of a triggering event from a software-enabled system communicatively coupled to the scheduling system.

8. The scheduling system as claimed in claim 1, wherein the scheduling system comprises a priority engine.

9. The scheduling system as claimed in claim 8, wherein the scheduling system further comprises a monitoring engine and a scheduling engine.

10. A method comprising:
receiving, at a scheduling compute device of a cluster computing network, a set of tasks, wherein the set of tasks is sequenced in a functional flow linking each task to another interdependent task within the set of tasks; and
executing the set of tasks at a cluster of compute devices in the cluster computing network according to a schedule, a cascaded priority mapping indicating an execution order of the set of tasks, and parallel scalability of the compute devices,
wherein the cascaded priority mapping comprises multiple serially interconnected priority value nodes each defining a respective priority for a task associated with a corresponding priority value node,
wherein the priority value nodes are arranged in successive layers each defining priorities for the set of tasks,
wherein each successive layer denotes a respective priority chain and comprises further priority value nodes linked to sub-tasks of tasks of a preceding layer,
wherein the cascaded priority mapping further comprises unique layer identifiers for each layer comprising a common base identifier corresponding to a respective layer and a listing identifier denoting a level of the respective layer within the succession,
wherein the common base identifier is the same for all priority value nodes within a same layer,
wherein respective identifiers of the priority chains of the cascaded priority mapping comprise a respective unique layer identifier and a position identifier denoting a position of a respective priority chain within a particular layer, and
wherein the unique layer identifiers along with the identifiers of the priority chains indicate a layer or priority chain to which a particular task belongs absent to requiring a traversal of the cascaded priority mapping.

11. The method as claimed in claim 10, wherein each priority chain comprises a subsequent priority value node corresponding to the sub-task of the task associated with a first priority value node.

12. The method as claimed in claim 11, wherein the cascaded priority mapping comprises a further set of priority value nodes originating from the subsequent priority value node, and wherein the further set of priority value nodes correspond to further sub-tasks corresponding to the task associated with the first priority value node.

13. The method as claimed in claim 10, wherein a first priority value node is associated with first priority value and a second priority value, wherein the first priority value denotes an order of priority of a task within the layered priority value nodes, and wherein the second priority value denotes an order of priority of the task associated with the first priority value node within the respective priority chain.

14. The method as claimed in claim 10, wherein the scheduling compute device comprises a priority engine, a monitoring engine, and a scheduling engine.

15. The method of claim 10, wherein a first priority value node from amongst the layered priority value nodes is attributed to a common base identifier that links the layered priority value nodes with an adjoining layer of nodes.

16. The method of claim 10, wherein the functional flow of the set of tasks are executed to constitute a single function to operate an autonomous vehicle.

17. A hardware computer-readable medium comprising instructions, the instructions being executable by a processing resource to:
execute a set of tasks at a cluster of compute devices in a cluster computing network based on a cascaded priority mapping indicating an execution order of the set of tasks and parallel scalability of the compute devices,
wherein the cascaded priority mapping comprises multiple serially interconnected priority value nodes each defining a respective priority for a task associated with a corresponding priority value node,
wherein the priority value nodes are arranged in successive layers each defining priorities for the set of tasks,
wherein each successive layer denotes a respective priority chain and comprises further priority value nodes linked to sub-tasks of tasks of a preceding layer,
wherein the set of tasks is sequenced in a functional flow that links a preceding task with a following task within the set of tasks,
wherein the cascaded priority mapping further comprises unique layer identifiers for each layer comprising a common base identifier corresponding to a respective layer and a listing identifier denoting a level of the respective layer within the succession,
wherein the common base identifier is the same for all priority value nodes within a same layer,
wherein respective identifiers of the priority chains of the cascaded priority mapping comprise a respective unique layer identifier and a position identifier denoting a position of a respective priority chain within a particular layer, and
wherein the unique layer identifiers along with the identifiers of the priority chains indicate a layer or priority chain to which a particular task belongs absent to requiring a traversal of the cascaded priority mapping.

18. The hardware computer-readable medium as claimed in claim 17, wherein the cascaded priority mapping comprises a plurality of levels of layered priority nodes, with respect to the layer of a first priority value node.

19. The hardware computer-readable medium as claimed in claim 17, wherein the cluster computing network further comprises a scheduling compute device having a priority engine.

20. The hardware computer-readable medium as claimed in claim 19, wherein the scheduling compute device further comprises a monitoring engine and a scheduling engine.

* * * * *